UNITED STATES PATENT OFFICE.

JOHN A. McCLELLAND, OF LOUISVILLE, KENTUCKY, ASSIGNOR, BY DIRECT AND MESNE ASSIGNMENTS, TO EMIL KIPPER, OF ADAMS, MASSACHUSETTS.

PLASTIC COMPOSITION.

SPECIFICATION forming part of Letters Patent No. 366,231, dated July 12, 1887.

Application filed May 21, 1884. Serial No. 132,352. (No specimens.)

*To all whom it may concern:*

Be it known that I, JOHN A. MCCLELLAND, a citizen of the United States of America, residing at Louisville, in the county of Jefferson and State of Kentucky, have invented certain new and useful Improvements in Plastic Compositions; and I do hereby declare the following to be a full, clear, and exact description of the invention, such as will enable others skilled in the art to which it appertains to make and use the same.

My invention relates to the manufacture of plastic material from pyroxyline or gun cotton, and in the employment of a new solvent therefor; and it consists in the discovery that non-volatile gums and resins may be efficiently and successfully employed as a solvent for pyroxyline.

My invention also consists in the combination of non-volatile gums or resins with pyroxyline, for the purpose of converting the pyroxyline so that it can be worked or molded into compounds useful in the arts.

My invention further consists in the employment of kauri gum, Dammara resin, gum-dammar, (*Dammara australis*,) as a substitute for the solvents formerly used—such as camphor, alcohol, and ether; and by the use of the aforesaid kauri gum I am enabled to produce an improved plastic compound which has not the objectionable features of celluloid, chrolithion, zylonite, and other pyroxyline compounds as heretofore made.

The object of my invention is to provide a new and improved solvent for converting soluble pyroxyline into such a condition that it can be successfully and efficiently molded or worked.

The use of camphor, ether, and alcohol, and the other well-known solvents for pyroxyline, produce a plastic in which there is a great liability of shrinkage and warping, owing to the evaporation of the solvents, which are volatile, and the product soon loses its plasticity, and can only be reworked while the solvent or solvents remain with the base, or, in other words, while the material is somewhat fresh.

In the manufacture of plastic compounds it has been suggested to add wax, gums, balsams, and resins for the purpose of causing atoms to adhere and for other purposes, as hardening the composition, as may be seen by referring to my patent dated April 28, 1868; but these materials have not heretofore been employed as a solvent.

Kauri gum, which I employ as a solvent for pyroxyline, is non-volatile, and being a hard resinous body remains as a permanent constituent of the pyroxyline compound into which it enters, and the compound can be molded readily under heat and pressure, and articles made therefrom have no odor and do not shrink and warp, and no seasoning of the material or of the articles made therefrom is necessary. Another advantage which kauri gum possesses over other solvents of pyroxyline is that the compound made therefrom can be readily welded or joined together, and small pieces or chips can be formed into a solid mass when moderately heated and placed under pressure without the use of solvents.

The compound is readily distinguished from other products of pyroxyline in addition to the above-named advantages from the fact that it can be molded by heat and pressure after the stock becomes old, and in that it does not sensibly deteriorate by time.

One of the methods of making my improved compound by the use of kauri gum, or fossil gum, or resin, or other non-volatile gum or resin, or non-volatile gum-resin solvent is as follows: The gum or resin (preferably kauri or dammar) is first reduced to a powder and incorporated with the pyroxyline, which, by preference, has been previously pulped (though this is not essential) and a thorough mechanical mixture is effected. If it be desired to add coloring-matter, oils, or pigments, these ingredients are now added, after which a further mechanical mixture is gone through with. I have found it advantageous to incorporate with the mixture some saccharine matter, which, if desired, should now be added.

To impact the mass and facilitate it going on the rolls, it may be sprinkled or dampened down with wood-alcohol before attempting its conversion.

To convert the composition, the ingredients, mixed as before stated, are placed on the rolls, which may be slightly heated for the purpose of hastening chemical action, and the compound is rolled until it becomes a homogeneous mass, when it may be readily formed into blocks or sheets, or, if desirable, it can be placed into a stuffing-cylinder and heated, when it can be forced out of the same in the form of rods or tubes.

I have discovered that non-volatile gums, resins, or gum-resins can be advantageously and successfully used as solvents for pyroxyline, so as to render it a perfect homogeneous mass, capable of being molded or worked into any form desired, and that the same may be colored by the use of coloring-matter, pigments, or otherwise and by chemical action.

Oils, either fixed or volatile, may be added to the composition in the usual manner as is common in the manufacture of pyroxyline compounds to render the composition less brittle.

Having thus described my invention, what I claim is—

1. A non-volatile gum or resin as a solvent for pyroxyline.

2. A composition having a pyroxyline base and a non-volatile gum or resin incorporated therewith as a solvent.

3. A manufactured plastic composition having a pyroxyline base with a non-volatile gum or resin solvent incorporated therewith.

4. The combination of kauri gum with pyroxyline.

5. The combination of pyroxyline, kauri gum, and a coloring-matter.

6. The combination of pyroxyline, a non-volatile gum, or resinous solvent therefor, and a coloring-matter or pigment.

7. The combination of pyroxyline, a non-volatile gum or resinous solvent therefor, and a fixed or volatile oil, for the purpose set forth.

8. The combination, with pyroxyline, of a non-volatile gum or resin incorporated therewith as a solvent, a pigment or other coloring-matter, and a fixed or volatile oil, substantially as described.

9. As a new article of manufacture, a plastic composition having a pyroxyline or soluble base, and kauri gum incorporated therewith, substantially as set forth.

10. A manufactured plastic consisting of a pyroxyline base, a non-volatile gum or resin solvent incorporated therewith, and a coloring substance or pigment, substantially as described.

11. Kauri gum as a solvent in the manufacture of plastic compounds having a pyroxyline base, substantially as set forth.

12. In the manufacture of plastic compounds from pyroxyline, the combination of saccharine matter with pyroxyline and kauri gum.

13. In the manufacture of plastic compounds from pyroxyline, the combination of kauri gum and oils with or without saccharine matter.

In testimony whereof I affix my signature in presence of two witnesses.

JOHN A. McCLELLAND.

Witnesses:
  JOHN N. PIKE,
  MILTON S. THOMPSON.